United States Patent [19]

Gish

[11] Patent Number: 4,581,841
[45] Date of Patent: Apr. 15, 1986

[54] ANIMATED FISHING LURE

[76] Inventor: Joseph C. Gish, 209 Vaughn, Ironwood, Mich. 49938

[21] Appl. No.: 745,515

[22] Filed: Jun. 17, 1985

[51] Int. Cl.⁴ .............................................. A01K 85/06
[52] U.S. Cl. .................... 43/26.2; 43/42.02; 43/42.45; 43/42.03; 446/156
[58] Field of Search ................ 43/42.02, 26.2, 42.03, 43/42.45; 446/272, 288, 156, 159

[56] References Cited

U.S. PATENT DOCUMENTS 1,393,617  10/1921  Frame ................................ 43/42.02
2,498,352  2/1950  Bergman ............................. 43/26.2

FOREIGN PATENT DOCUMENTS 465223  5/1950  Canada ................................ 43/26.2

Primary Examiner—Nicholas P. Godici
Assistant Examiner—K. Skillman
Attorney, Agent, or Firm—Eugene C. Knoblock

[57] ABSTRACT

A fishing lure having a body movably mounting fin and tail simulations and having means responding to intermittent pulls on a fishing line for activating said fin and tail simulations.

2 Claims, 6 Drawing Figures

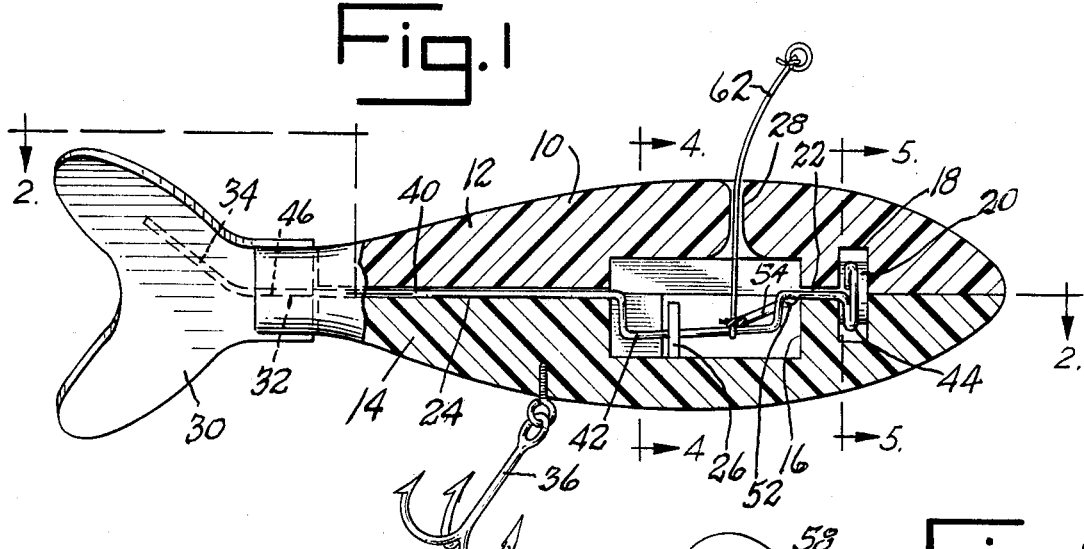
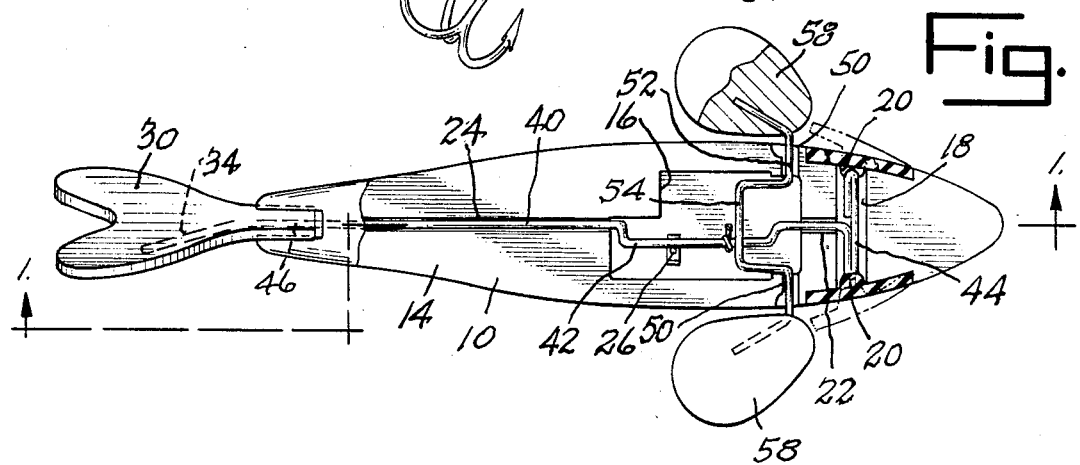
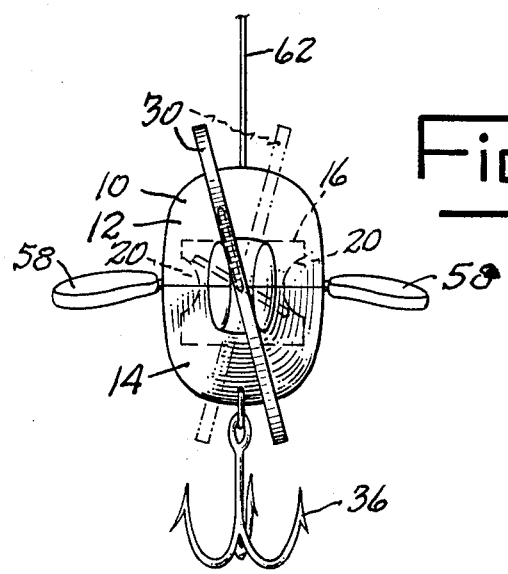

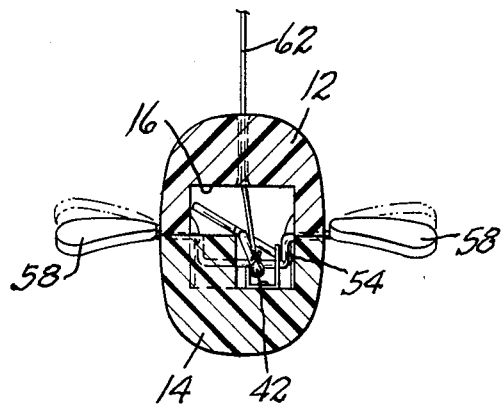
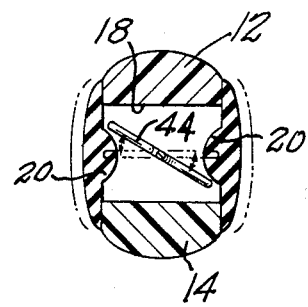
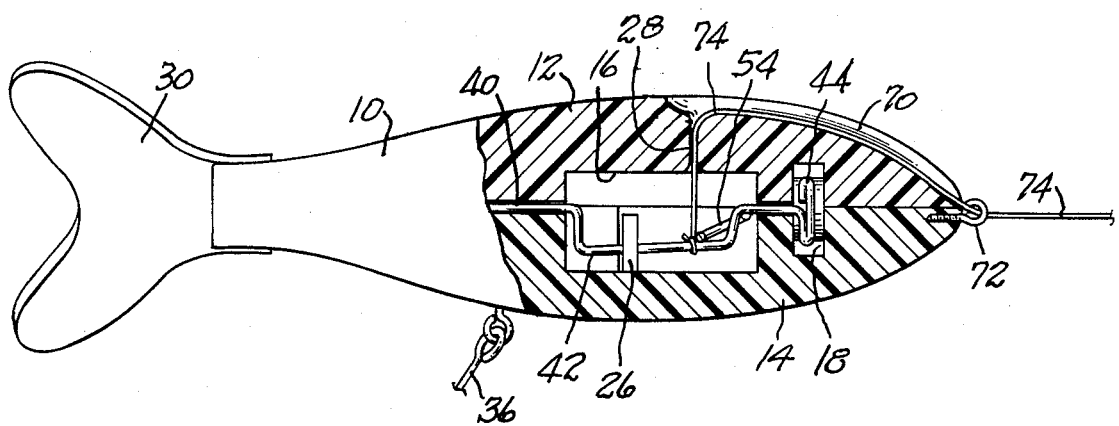

ANIMATED FISHING LURE

SUMMARY OF THE INVENTION

This invention relates to animated fishing lures of the character having fins at the sides thereof which are mounted to rock relative to the body and provided with a tail portion adapted to rotate through a slight angle as the lure is drawn through the water.

The primary object of the invention is to provide a construction of animated fishing lure which is simple in construction, inexpensive, easy to operate and which provides a simulation of a swimming minnow as it is drawn through the water.

A further object is to provide a device of this character which has a simple construction for activating the moveable parts of the lure.

Other objects will be apparent from the following specification.

BRIEF DESCRIPTION OF THE DRAWINGS

FIG. 1 is a side view of a fishing lure shown partly in section taken on line 1—1 of FIG. 2.

FIG. 2 is a view of a lure taken on line 2—2 of FIG. 1 and illustrated partly in section.

FIG. 3 is a rear view of the lure.

FIG. 4 is a transverse sectional view of the lure taken on line 4—4 of FIG. 1.

FIG. 5 is a transverse sectional view of the lure taken on line 5—5 of FIG. 1.

FIG. 6 is a side view of a modified embodiment of the invention with parts shown in section.

DESCRIPTION OF THE PREFERRED EMBODIMENT

Referring to the drawing, and particularly to FIGS. 1-5 thereof which illustrate one embodiment of the invention, the numeral 10 designates a body portion which preferably is formed of an upper body portion 12 and a lower body portion 14 which are bonded or secured together. The body parts may be formed of any suitable material such as wood or plastic. At the central portion of the interior of the body is formed a cavity 16 formed partially in each of the body parts 12 and 14 in registering relation. A second cavity 18, preferably of smaller size than the cavity 16 is formed in the interior of the body spaced forwardly from the cavity 16. Cavity 18 is preferably characterized by inwardly projecting parts 20 at opposite sides thereof for purposes to be described. A longitudinal passage 22 of restricted diameter is formed between the housing parts 12 and 14 and extends between the body cavities 16 and 18 longitudinally of the body. A longitudinal rear passage 24 axially aligned with the passage 22 extends from the cavity 16 to the rear end of the body portion 10. A pair of laterally spaced internal projections 26 are formed in the cavity 16. A passage 28 extends through the upper body part 12 from a part of cavity 16 preferably spaced from the projections 26.

A tail simulating part 30 is journaled on and projects rearwardly from the body 10. The tail part 30 has a passage portion 32 axially aligned with the passage 24 and an angularly extending rear tail passage 34 which communicates with tail passage 32 and terminates within the tail part. One or more fish hooks 36 are carried by the body preferably at the bottom thereof or at any selected position.

A substantially rigid longitudinal elongated wire, member or rod 40 is journaled in the passages 22 and 24 and is characterized by an offset portion 42 positioned within the body cavity 16 between the projections 26. The forward portion of the member 40 terminates in a laterally projecting part 44 located within the cavity 18 and free to rotate therein through a limited angular extent as determined by the inward projections 20 in the cavity 18. The rear portion 46 of the member 40 projects rearwardly from the body 10 and into the tail simulating part 30 with its rear portion anchored in the rear tail passage 34. The arrangement is such that rotative action of the member 40 rotates the tail portion 30 to an extent limited by the internal projections 20 in the front cavity 18.

The body 10 is provided with a pair of substantially axially aligned lateral passages 50 which communicates with the body cavity 16 and which journal substantially aligned portions 52 of a cross wire, member or rod. The central portion 54 of the transverse member is substantially offset, as of U-shape, within the cavity 16 and overlying part 42 of the longitudinal member to accommodate limited rotation of the transverse member within cavity 16. The outer or terminal ends of the transverse member extend angularly rearwardly and each mounts a member 58 simulating a fish fin. A wire or other member 62 extends through a vertical passage in the body 10 and preferably has a loop at one end encircling the offset part 42 of the longitudinal member and projecting above the body, and may be provided with a loop or eyelet to which a fishing line may be secured.

In the embodiment illustrated in FIG. 6, a construction substantially similar to that in FIG. 1 is utilized, but is characterized by a longitudinal upper groove 70 formed in the upper portion 16 of the body and extending forwardly from the vertical passage 28 to a point adjacent the forward tip of the body. The body carries an eyelet 72 at its front central portion adjacent the groove 70. A line 74 is connected to the offset portion 42 of the longitudinal part and extends through the vertical passage 28 and hence through the groove 70 and the eyelet 72 for connection with a fishing rod not shown.

The body of the lure and the tail and fin simulating portions of the lure may be decorated in any desired manner as to simulate a minnow within the water. In use, a line 74 of FIG. 6 or a line connected to the part 62 at its upper free end extending to a fishing rod (not shown) accommodate use of the lure in a conventional manner for either casting or trolling. As the lure is located in the water and trolling occurs, or after casting thereof. Successive pulls or jerks on the line to advance the lure also result in activation of the longitudinal member 40 and the offset portion 54 thereof by the line 74 or the wire 62. Rotation of the longitudinal member resulting from such successive jerks or pulls by the line produce rotation of the member or rod 40 and rotation or lateral rocking of the tail portion 30 about the axis of the lure. The extent of rotation of the member 40 upon each activation thereof is determined and limited by engagement of the front portion 44 of the member 40 within cavity 18 as determined by the stop limits 20. At the same time that such rotation of the member 40 occurs, the offset center portion 54 of the transverse member which engages the offset part 42 of the longitudinal member is rotated to rock the fins 58 through a limited angle. Repetitive jerks or pulls upon the line thus result in movement of the lure and the tail and fin portions thereof in a motion closely resembling the motion of a swimming fish.

While preferred embodiments of the invention have been illustrated, it will be understood that changes in the construction may be made within the scope of the appended claims without departing from the spirit of the invention.

I claim:

1. An animated fishing lure comprising a fish simulating body having an interior cavity and a central passage extending from said cavity to the rear end of said body, a tail simulation rotatably carried by the rear of said body, a longitudinal elongated member journaled in said passage and having an off-set part in said cavity, said longitudinal elongated member having a portion extending angularly to the rotation axis of said tail simulation, and embedded in said tail simulation, said body having an open ended transverse passage communicating with said cavity, a transverse member rotatable in said transverse passage and terminating in angular projecting end portions, a fin simulation carried by each end portion of said transverse member, said transverse member having an off-set portion in said body cavity engageable by the off-set of said longitudinal elongated member, means for limiting rotation of said longitudinal journaled member in said body, and means connected to the off-set part of said longitudinal journaled member for connection with a fishing line and operative to rock both said longitudinal and transverse member.

2. The fishing lure defined in claim 1 wherein said means for connection with a fishing line is shiftably carried by said body.

* * * * *